United States Patent [19]
Welle

[11] Patent Number: 6,127,942
[45] Date of Patent: *Oct. 3, 2000

[54] ULTRASONIC POWER SENSORY SYSTEM

[75] Inventor: Richard P. Welle, Huntington Beach, Calif.

[73] Assignee: The Aerospace Corporation, El Segundo, Calif.

[ * ] Notice: This patent is subject to a terminal disclaimer.

[21] Appl. No.: 09/200,644

[22] Filed: Oct. 27, 1998

[51] Int. Cl.$^7$ .................................................. G08B 21/00
[52] U.S. Cl. ................................ 340/870.16; 340/870.3; 367/134; 73/642; 310/316
[58] Field of Search ............................ 340/870.16, 870.3, 340/612; 367/134; 73/642; 310/316, 317, 318, 319, 339

[56] References Cited

U.S. PATENT DOCUMENTS 4,387,599  6/1983  Samodovitz ............................... 73/642
5,650,685  7/1997  Kosinski et al. ......................... 310/316
5,982,297  11/1999  Welle ................................. 340/870.16

*Primary Examiner*—Michael Horabik
*Assistant Examiner*—Timothy Edwards, Jr.
*Attorney, Agent, or Firm*—Derrick Michael Reid

[57] ABSTRACT

A system includes a first transducer and a second transducer coupled together through a coupling medium communicating undulating pressure wave from the first transducer to the second transducer for the transfer of electrical power from an external controller energizing the first transducer transducing the power signal into an undulating pressure wave communicated through the medium to the second transducer traducing the undulating pressure wave into an electrical response signal that can be converted into useful power for powering an embedded sensory and actuation control unit. The primary advantage of the system is the transfer of power through a coupling medium without the use of electrical power wires.

7 Claims, 1 Drawing Sheet

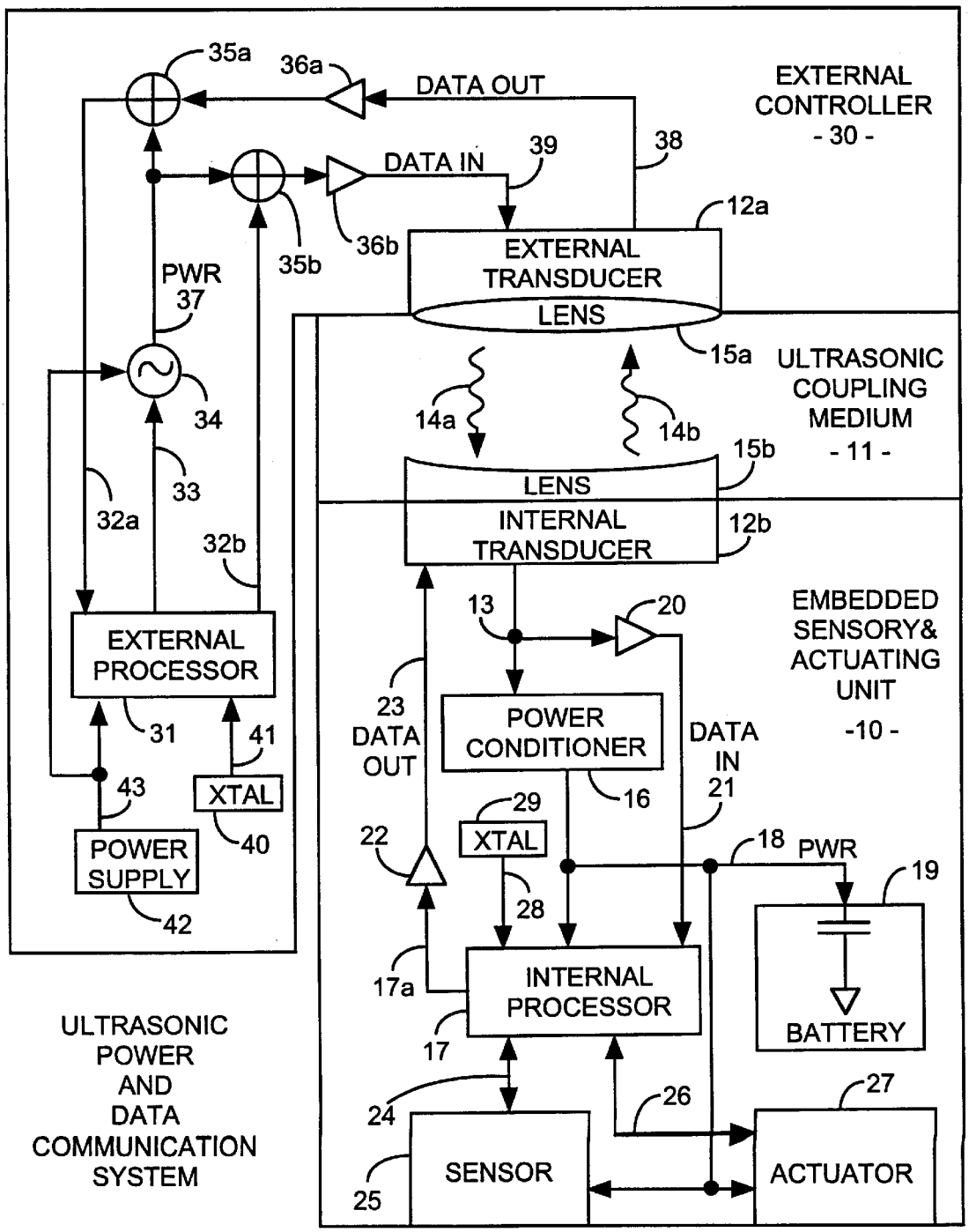

though bonding or positioning using a coupling medium. The produced ultrasonic wave intensity may have a uniform, Gaussian, or some other desired distribution. Other types of transducers may be shaped to include a transmitting receiving curved surface for focused transmission and collective reception of the ultrasonic waves. Various types of transmitting and receiving

ULTRASONIC POWER SENSORY SYSTEM

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States for governmental purpose without payment of royalty therefor.

REFERENCE TO RELATED APPLICATION

The present application is related to applicant's copending applications entitled Ultrasonic Data Communication System, Ser. No. 08/947,377 filed Oct. 8, 1997, now U.S. Pat. No. 5,982,297 and Ultrasonic Power Communication System, Ser. No. 08/947,376 filed Oct. 8, 1997, now U.S. Pat. No. 6,037,376 by the same inventor.

FIELD OF THE INVENTION

The invention relates to the field of undulating pressure wave transducers including acoustic, sonic and ultrasonic transducers, devices and systems. More particularly, the present invention relates to the communication of power and or data signals communicated between two ultrasonic transducers separated by and communicating ultrasonic undulating pressure waves through an ultrasonic coupling medium.

BACKGROUND OF THE INVENTION

Devices and systems having transducers which transduce electrical energy to and from undulation pressure waves such as audio, acoustical, sonic and ultrasonic pressure waves, have existed for some time. Such transducers may include crystal, piezoelectric, magnetostrictive, inductive, vibrating, diaphragm, audio, acoustic, sonic, subsonic and ultrasonic transducers, among many other exemplar types of transducers. In a forward direction, the transducers are coupled to sources of electrical energy having frequencies of respective energizing signals at the resonant frequencies of the transducers for efficient transfer of energy from the electrical energy sources to the transducers then imparting energy in the form of the oscillating undulating pressure waves to loads coupled to the transducers. In a reverse direction, the transducers receive energy of undulating pressure waves from sources of undulating pressure waves and transduce the energy of those undulating pressure waves into electrical energy delivered to loads of electrical energy.

U.S. Pat. No. 3,958,559 entitled Ultrasonic Transducer teaches an ultrasound pulse echo imaging system using piano concave lens of elliptical shape positioned in front of the transducer for producing an extremely narrow ultrasonic beam and providing a large aperture to maximize ultrasound power output from the transducer and capture angle of reflected echoes. The transducer both sends through electrical excitation and receives ultrasonic wave beams generating electrical output signals. The transducer is a conventional flat disc transducer producing an essentially collimated beam of ultrasound of frontal parallel pressure waves but having an ellipsoidal plano concave leans disposed in the front of the transducer though bonding or positioning using a coupling medium. The produced ultrasonic wave intensity may have a uniform, Gaussian, or some other desired distribution. Other types of transducers may be shaped to include a transmitting receiving curved surface for focused transmission and collective reception of the ultrasonic waves. Various types of transmitting and receiving transducers having coupled lens or curved surfaces for focused transmission and collective reception of ultrasonic waves are well known by those skilled in the art of ultrasonic transducer designs.

U.S. Pat. No. 4,368,410 entitled Ultrasound Therapy Device teaches maintaining constant electrical energizing power to a transducer regardless of the load on the transducer using an analog servo feedback circuit. The device may be operated to emit an ultrasonic frequency and driven by continuous wave signals, or pulse mode signals where the pulse period and duration are selectable using operator switches. The pulse range may be between ten and five hundred microseconds. Negative feedback signals representing current and voltage drawn by the transducer are supplied to an analog multiplier where the actual power delivered to the transducer is calculated and used to maintain the power delivered to the transducer. Comparators are used to supply error signals for open and closed circuit conditions to prevent loss of coupling or overheating of the transducer. These types of closed loop control and sensing systems, methods and implementing devices are well known by those skilled in the art of transducer device and system design.

U.S. Pat. No. 4,966,131 entitled Ultrasound Power Generating System with Sample Data Frequency Control teaches the use of a disk shaped crystal transducer actuated by an electrical power source having a control frequency for the efficient coupling of electrical energy into acoustic energy injected into a human body. The system includes the crystal transducer having excitation electrodes and radio frequency (RF) power amplifiers for supplying electrical power to the transducer. The system includes a single chip microprocessor having analog to digital converters, digital to analog converters, input-output communication means, on board random access memory (RAM) and read only memory (ROM) for operational sensing and control of electrical circuits including an RF signal sensor and a voltage controlled oscillator for controlling the excitation frequency to efficiently deliver electrical power to the transducer then providing desired acoustic energy to a human load. These types of microprocessor and connected circuit designs for electrically driving ultrasonic transducers are well known by those skilled in the art of transducer device and system designs.

U.S. Pat. No. 5,396,888 entitled Non Contact Tonometer and Method of Using Ultrasonic Beams teaches an ultrasonic transducer directing an ultrasonic beam which is detected by an ultrasonic or optical means. An ultrasonic beam is used for ranging measurements. The ultrasonic transducer may be activated by continuous wave of pulse mode signals using electronic feed back control. High ultrasonic frequencies between 100.0 KHz and 1.0 MHz are used to energize a transducer generating and projecting the directed ultrasonic beam. The ultrasonic beam can be modulated, directed and focused by conventional means. The ultrasonic power level can be modulated at high frequency to enable phase sensitive demodulation for detection. High bandwidth servo loops can control the intensity of the ultrasonic beam. The ultrasonic beams produce a pressure field with a Gaussian profile. The transducer may be a piezoelectric crystal, magnetostrictive element or a vibrating diaphragm, among others.

This patented transducer system comprises a plurality of coupled transducers, a primary transducer for transmitting the directed ultrasonic beam and secondary transducers for detecting the effect of the primary directed beam communicated at least in part through a coupling medium. The primary transducer is activated by an oscillator producing an amplitude modulation of an ultrasonic frequency signal. One secondary transducer detects a reflected ultrasonic beam indicating the amount of indentation effect of the primary ultrasonic beam on human eye tissue reflecting the transmitted beam. Another secondary ultrasonic transducer is for detecting and measuring the power transmitted and for controlling the amount of power transmitted by the primary transducer. Another secondary ultrasonic ranging transducer is colocated with the primary transducers and is used for detecting the transmitted beam for aligning the primary transducer with the eye load. The secondary transducer for measuring the indentation can be switched from either transmitting or receiving the directed ultrasonic beam. Transducer input and output signals can be modulated and demodulated for signal transmission and phase detection using conventional mixers and phase detectors. Systems and devices for generating, directing and focusing a primary transducer beam through a coupling medium for subsequent detection by a plurality of secondary transducers are well known by those skilled in the art of ultrasonic transducer device and system design.

Those skilled in the art of transducer devices and systems are well adept at configuring specific transducers and electronic components for generating undulating pressure waves transmitted into and or received through a coupling medium for detecting information about the medium or its contents. However, those transducer devices and systems disadvantageously rely only on the sensing of the acoustic transmitting and reflecting properties of the medium and or its contents to obtain information about the system.

There are many applications that sense critical operating parameters of a component in which it is exceedingly undesirable to connect electrical wires between the power supplies and the sensors, actuators, controllers, processors, and transmitters and receivers.

Continuing progress in Micro Electro Mechanical Systems (MEMS) has led to the development of advanced, miniaturized, multi-functional systems which provide improved capabilities for sensing, monitoring and control of various parameters and functions at very low power to enhance the health, safety, and reliability of current generation spacecraft and launch vehicles, as well as on newly emerging concepts for miniature spacecraft. Such devices are also useful in terrestrial applications such as motor vehicles and structures. Current MEMS devices often take advantage of manufacturing technologies developed for microelectronics, along with subscaled applications of macroscopic devices such as valves, pumps, or power systems. Typical MEMS systems disadvantageously require the use of external power supplies and data processors for controlling the operation of systems and sensing information about systems. Many applications of micro devices, particularly micro sensors, require that the devices be wireless. This has led to devices having limited usefulness and lifetime due to the limited capacity of on board batteries. These and other disadvantages are solved or reduced using the invention.

SUMMARY OF THE INVENTION

An object of the invention is to provide a system for transmitting power through a coupling medium communicating undulating pressure waves between opposing transducers.

Another object of the invention is to provide a system for transmitting data through a coupling medium communicating undulating pressure waves between opposing transducers.

Yet another object of the invention is to provide a system for transmitting power and or data through a coupling medium communicating undulating pressure waves between opposing transducers to supply power to embedded sensors or actuators without the use of electrical wires extending through the coupling medium.

Yet a further object of the invention is to provide a system for transmitting power and or data through a coupling medium communicating undulating pressure waves between opposing transducers to supply power and to communicate data to an embedded processor for controlling embedded sensors and or actuators without the use of electrical wires extending through the coupling medium.

The present invention is primarily directed to wireless embedded microsensor and microactuator systems and other wireless devices particularly using transducers generating undulating pressure waves for power transmission for powering embedded wireless devices. In another form, the invention is further directed to encoding and decoding the undulating pressure waves with data communicated to and or from the wireless devices. The invention includes means for providing power and or data signals to embedded devices through application of undulating pressure waves generated and or energized by opposing transducers, such as ultrasonic transducers. In a representative implementation, such as in an aircraft or rocket fuel tank, the wireless device is embedded inside fuel tank with wireless power and data communication from an external control unit. An embedded sensory unit could include an exemplar fuel level sensor. Both the internal embedded sensory unit and the external control unit use respective transducers to communicate power and or data through ultrasonic pressure waves transmitted through a coupling medium, such a the wall of the fuel tank. The embedded sensory unit is preferably embedded in or attached to the internal side of the exemplar fuel tank and the control unit is attached to the external side of the fuel tank so that no wires need be fed through the fuel tank wall thereby reducing the potential of ignition of the fuel by a faulty electrical wire. An internal embedded microprocessor would be connected to both a sensing element and a power conversion element. The transducers are preferably piezoelectric transducers tuned to a particular frequency. An internal transducer when energized by undulating pressure waves from an external transducer would provide an electrical response signal to an electronic rectifier element to convert the electrical response signal from the internal transducer to useful electric power to power the microprocessor, and any embedded connected sensors or actuators. The ultrasonic pressure wave would be generated in the structure by the external ultrasonic transducer tuned to the frequency of the internal piezoelectric transducer of the embedded sensory unit. The ultrasonic waves would excite an oscillation in the internal transducer in the embedded sensory unit, and the oscillation would, in turn, generate the electrical response signal which could be then converted to a power signal of useful electric power to power the entire embedded sensory and or actuating unit. The energizing signal and the resulting electrical response signal may also be appropriately modulated for the communication of digital data used for controlling the embedded microprocessors, sensors and actuators. In the preferred form, the power would then be used to activate and power the embedded sensor and or actuator and the digital signals could be used to control the embedded microprocessor to interrogate the embedded sensor or control the embedded actuator. The power signal would power any associated embedded electronic components necessary for interpreting input data signals from the external control unit and for generating output data signals communicated to the external control unit.

Additionally, the embedded sensory unit could include microprocessing means for generating output data signals and include transducer drive means for activating the internal transducer for communicating data to the external control unit connected to the external transducer. The converted power in the embedded unit could also be stored in an embedded battery or capacitor for longer term operations of the embedded sensory unit. An internal battery would enable bidirectional data without the need for transmitting power through the coupling medium. Data acquired from the embedded sensor is also communicated by encoding the data in ultrasonic waves generated by the same piezoelectric transducer used to collect the input data and or power. The encoded waves would then be collected by an external transducer providing an external data signal to the external control unit. The external control unit could communicate bidirectional data to the internal microprocessor for monitoring the embedded sensors and for controlling the internal actuators.

The primary advantage of the invention is the use of embedded active wireless sensors and actuators which can be integrated into structures such as composite motor cases, or propellant tanks without the use of connecting wires. The invention will also provide power and or data communication for devices embedded or enclosed in conducting materials where penetration of the radio frequency electromagnetic waves typically used for wireless communication is impossible or impracticable. These devices can also be used in any other application where good undulating pressure wave coupling is ensured. Additional applications include monitoring of structures such as bridges or buildings, or of large vehicles such as ships or aircraft. These and other advantages will become more apparent from the following detailed description of the preferred embodiment.

BRIEF DESCRIPTION OF THE DRAWING

The drawing depicts an ultrasonic power and data communication system.

DETAILED DESCRIPTION OF THE PREFERRED EMBODIMENT

An exemplar embodiment of the invention is described with reference to the drawing using reference designations as shown in the drawing. An embedded sensory and actuating unit 10 is positioned in contact with an undulating coupling medium 11 which is preferably an ultrasonic coupling medium 11 separating an external transducer 12a and an internal transducer 12b opposing each other. The embedded unit 10 preferably comprises an electrical isolation material such as cured rubber matrix materials for electrically isolating the electrical signals within the unit 10 from an environment in which the embedded unit 10 is disposed.

The internal transducer 12b generates an electrical response signal 13 when energized by input ultrasonic waves 14a communicated from the external transducer 12a through the coupling medium 11 to the internal transducer 12b. The internal transducer 12b also generates output ultrasonic waves 14b also communicated through the ultrasonic coupling medium 11 to the external transducer 12a. The transducers 12 are members of a group of transducers that transduce electrical signals to and or from undulating pressure waves 14. The coupling medium 11 could be any medium that is capable of communicating undulating pressure waves 14 such as audio, acoustical, subsonic, sonic and ultrasonic undulating pressure waves tuned to an energizing frequency of the transducers 12. The transducers 12 generate the undulating pressure waves 14 over any suitable frequency preferably from sub audio frequencies to radio frequencies but of a particular frequency suitable for efficient transmission of the energy of the undulating waves 14 through the medium 11. The medium 11 could be any solid, such as metal, concrete, ceramic, epoxy, composite, any semi solid, such as rubber and gels, any fluid, such as water or fuels, or any gas, such as air and gas carriers, all of which media 11 can communicate the undulating pressure waves 14. The selected transducers 12 and medium 11 are application specific, but generally low frequency undulating pressure waves 14 travel farther than high frequency waves 14. The distance between the transducers 12 is also application specific and based upon the type of transducers 12 selected and the type of coupling medium 11 used in the application in view of any application restriction on the placement location of the transducers 12. Those skilled in the art of transducer device and system designs can readily select suitable transducers 12, coupling medium 11 and transducer separation distances to configure the coupling arrangement for efficient energy transfer of power and or data signals between the transducers 12 for a particular application.

The exemplar transducer coupling arrangement comprises piezoelectric transducers 12a–b communicating power and data signals encoded in the ultrasonic waves 14a–b through a solid medium 11 such as solid metal used in aircraft or rocket fuel tanks. The transducers 12a–b are preferably opposing input output transducers 12 as both can be used to communicate bidirectional data, but multiple unidirectional transducers 12 could also be used to provide full duplex communication using two pairs of unidirectional communicating transducers 12.

The transducers 12 and coupling medium 11 may be one of many types of desired coupling arrangements based upon specific applications. For example, the coupling arrangement comprising the transducers 12 and coupling medium 11, may include piezoelectric transducers 12 preferably for generating ultrasonic waves 14 through a solid or a semi solid or liquid medium 11, ultrasound transducers generating sonic or ultrasonic waves through semi solid human body tissue, tuned electro mechanical transducers 12 such as a spring suspended weights coupled to magnetic inductors for generating low frequency waves 14 through a fluid, acoustic magnetic coil speaker transducers for generating acoustic waves 14 through a semi solid, fluid or a gas medium 11, among many available types of coupling arrangements. Hence, the coupling arrangement of the transducers 12 and coupling medium 11 cover a wide scope of equivalent coupling arrangements where power and or data is communicated through a coupling medium 11 communicating undulating pressure waves 14.

The opposing transducers 12a and 12b may produce collimated waves 14a and 14b, respectively, but alternatively and preferably have respective lenses 15a and 15b for focusing the waves 14a and 14b onto respective opposing transducers 12b and 12a for concentrating power transfer and for improving data reception through the opposing transducers 12b and 12a. The lens 15a is shown by way of example as a typical refractive type lens whereas lens 15b is shown as a curved transducer surface both of which function to focus the waves 14a and 14b for efficient power transfer to the opposing transducers 12b and 12a. The lens 15b and transducers 12b may be an integral structure, for example, a curved 1.0 mm thick piezoelectric transducer having a 15.0 cm focal length.

The electrical response signal 13 is communicated to a power conditioner 16 for providing power to an internal processor 17 through an internal power signal 18 which may also be communicated to a battery 19 or an electrical energy storage means, such as a capacitor. The processor 17 is preferably a power efficient microprocessor which preferably includes on board RAM and ROM for digital processing and further includes both digital and analog input output ports necessary for interfacing the processor 17 with the sensor 25 and the actuator 27. The battery 19 is preferably a rechargeable battery, and could be a conventional nickel cadmium battery, but could also be a fixed life time battery used as either a primary power supply for a fixed amount of time or as a backup power supply used only during interrupted or discontinuous electrical response signals 13 providing power to the power conditioner 16.

In the preferred form, the power conditioner 16 provides power through power signal 18 to the internal processor 17 and to the battery 19 during times when power is being received. The processor 17 may be intermittently active dissipating active power during active operation or dissipating little power when the processor 17 is inactive. During dormant periods, power may need not be received. When power is received, the power can be used to charge the battery 19 even when the processor 17 is inactive in a dormant state. In alternative forms of supplying power, the power conditioner 16 could supply power to battery for charging the battery 19 to store a sufficient amount of power to power the processor 17 only when active, in the case where the amount of power delivered through the power conditioner 16 is insufficient to directly power the processor 17 when active, but is sufficient to charge the battery 19 to such a storage capacity level that regular intermittent powered operation of the processor 17 is practicable to achieve the primary functions of the embedded unit 10. The processor 17 preferably includes programs for processing data and for sensor monitoring and or actuator control within the embedded unit 10.

The electrical response signal 13 may also include encoded data signals and is preferably connected to an internal data input driver 20 for communicating data in signals 21 to the internal processor 17. In alternative forms, the embedded unit 10 may include a separate pair of power transducers, not shown, such as transducers 12a–b for delivering power through ultrasonic waves 14a to the embedded unit 10 and another separate pair of input data transducers, not shown, such as transducers 12a–b for communicating only input data signals, through ultrasonic waves 14a. The internal processor 17 is also preferably connected to an internal data output driver 22 providing data out signals 23 communicated to and energizing the internal transducer 12b providing ultrasonic waves 14b having encoded output data communicated through transducers 12b to the external transducer 12a. In alternative forms, the embedded unit 10 may further include yet another separate pair of output data transducers, not shown, such as transducers 12a–b for communicating output data through respective ultrasonic waves 14b. Depending on the type of drivers 20 and 22, power could also be routed, not shown for convenience, and delivered to the drivers 20 and 22 through the power line 18 for powering the drivers 20 and 22 from either the power conditioner 16 or the battery 19.

Preferably, the processor 17 communicates control and monitoring sensor signals 24 to and or from an exposed embedded sensor 25, and communicates control and monitoring actuator signals 26 to and or from an exposed embedded actuator 27. The sensor 25 could be of a variety desired types, such as a thermistor for sensing temperature of an environment, not shown, a resistive bridge strain gauge for sensing stress in a structure, not shown, fluid level sensors, pressure sensors, chemical sensors, humidity sensors, photo sensors and accelerometer sensors, among many other types. The actuator 27 could also be of a variety of desired types, such as micro electrical mechanical fluid valves and pumps dispensing and injecting fluids, human heart pacemakers, heaters for temperature control, optical transducers, ultrasonic transducers, piezoelectric transducers, vibration control transducers, platform directional control transducers, among many other types. Those skilled in the art of sensor and actuator devices and designs know how to readily select and interface differing sensors 25 and actuators 27 to processors 17 and power supplies 19 for operation sensing and actuation.

The sensor 25 and or actuator 27 receive power from the power conditioner 16 and or battery 19. Some sensors 24 may not require active control signals 24 but only provide unidirectional sensing monitoring signals 24 to the processor 17 depending on the type of sensor used. Likewise, some actuators 27 may not provide actuating monitoring signals but only receive unidirectional actuator control signals 26 from the processor 17 depending on the type of actuator 27 used. In a preferred common mode of operation, the processor 17 under program control and in response to controller data commands encoded in data in signals 21 would provide the actuator 27 with activation control signals 26 to activate the actuator 27 causing an environmental change to be sensed by the sensor 25 which then provides sensing monitoring signals 24 to the processor 17 which then could in turn communicate responsive output data signals 17a through the data out driver 22 for communicating status of the actuation of the actuator 27.

Further still, multiple embedded units 10, transducers 12, sensors 25 and actuators 27 in various desired configurations are possible to achieve a desired bandwidth and multiplex operation. Such configurations may include a plurality of embedded units 10 with respective internal processors 17. Each unit 10 would receive communicated power and would communicate input and output data signals 21 and 23. Each of the embedded units 10 could have respective sensors 25 and actuators 27. While the present preferred form is described with reference to a single pair of transducers 12a–b and a single embedded unit 10, the present invention can be easily extended to system networks and configurations using a plurality of respective transducer pairs 12a–b, processors 17, sensors 25 and actuators 27 in respective embedded units 10 distributed, for example, over a wide area using respective separate coupling medium 11, or along a single elongated coupling medium 11.

The processor 17 may be connected to an embedded internal oscillator 29 providing an oscillating signal 28 to provide the processor 17 with timing signals for clocking and timing operations of the processor 17. The oscillator signal 29 could also be used by the processor 17 to demodulate input data on the data in signal 21 and or to modulate output data into the data out signal 23 for encoding of the output data into the data out signal 23 for efficient transmission of the data out signal 23 through the transducers 12a–b and coupling medium 11. There are many well known modulation techniques available, such has conventional sinusoidal modulation and digital modulation.

The embedded unit 10 is coupled through the transducers 12 and coupling medium 11 to an external controller 30 which may, for example, comprise an external processor 31 also preferably including typical on board or connected RAM and ROM, not shown, for digital processing and operational control over the embedded unit 10. The external processor 31 may be a personal computer, central processing unit, or microprocessor, or like processing means. The external controller 30 may be permanently mounted to the coupling medium 11 or could be a hand held unit which is manually positioned onto the medium 11 and then activated to command and or interrogate the embedded unit 10. Typically, the external processor 31 and the internal processor 17 function in a master-slave cooperation. In a distributive system, not shown, the external processor 31 could be a central processing unit commanding and controlling a plurality of internal microprocessors 17 functioning as distributed processors operating within respective embedded units 10.

The external processor 31 receives input signals 32a, transmits output signals 32b and transmits power control signals 33. The power control signals 33 are communicated to an external generator 34. The input signals 32a and output signals 32b are respectively connected to a separator 35a and a combiner 35b respectively connected to drivers 36a and 36b. One or both of the separator 35a and combiner 35b may be connected to a power modulation demodulation signal 37 generated by the generator 34. The separator 35a receives data out signals 38 from the external transducer 12a and the combiner 35b transmits data in signals 39 to the external transducer 12a through the respective drivers 36a and 36b. The driver 36a provides for necessary detection and amplification to interface the data out signals 38 from the transducer 12a to the separator 35a and or external processor 31. The driver 36b provides necessary detection and amplification for energizing the external transducer 12a. The data out signals 38 from the external transducer 12a become the data in signals 32a to the external processor 31 and the data in signals 39 to the external transducer 12a derive from the data out signals 32b from the external processor 31. An oscillator 40 such as a crystal oscillator provides an oscillating signal 41 for clocking the external processor 31. A power supply 42 supplies power 43 to the external processor 31 and to the generator 34. The power supply 42 could also provide power to the combiners 35 and drivers 36 depending on the type of combiners 35 and drivers 36 used.

In a power transfer mode of operation, the external processor 31 provides generator control signals 33 to the generator 34 for controlling the amplitude, phase and or frequency of the power signal 37 for efficiently transferring power from the supply 43, through the generator 34, through the transducers 12a–b to the internal power conditioner 16 of the embedded unit 10. In the case where power transfer is continuous, the external processor 31 need not actually control the generator 37 providing a continuous power signal through the driver 36b to the transducer 12a. In the preferred form, the power signal 37 and the output signals 32 are communicated either simultaneously or through time division multiplexing over the data in signal 39 using a common combiner 35b, but a separate line and driver, both not shown for convenience, could be used to separately communicate power and data over respective separate lines to the energize one external transducer 12a or two respective external transducers 12a. The various methods of supplying of power to the internal processor 17 can also be applied to the sensor 25 and actuator 27. Continuous or intermittent power can be supplied at differing times to the sensor 25 and actuator 27 from either the power conditioner 16 or battery 19 during active operation of the sensor 25 and actuator 27.

In a data input mode of operation, the external processor 31 provides output signals 32b which may be modulated by a modulation signal 37 using combiner 35b to energize the external transducer 12a through the driver 36b. In a data output mode of operation, the external processor 31 would receive the output signals 32a which may be demodulated by a demodulation signal 37 using separator 35a receiving through the driver 36a the data out signals 39 from the external transducer 12a.

Proof of concept may be had using two opposing 0.5 inch diameter disk shaped piezoelectric transducers 12a–b submerged in water functioning as the ultrasonic coupling medium 11. The transducers 12a–b are separated, for example, by 9.25 inches, and aligned so that ultrasonic waves from the transmitting transducer 12a are directed towards the receiving transducers 12b. The transmitting transducer 12a is energized by a radio frequency (RF) signal 37 from an RF generator 34 providing a 90.0 volt RMS sine wave signal at a frequency of 1.0 MHz. The receiving transducer 12b is connected to a variable resistive load emulating the power conditioner 16 which is connected to a 1.0 megohm input impedance oscilloscope for detecting the electrical response signal 13 from the receiving transducer 12b across the variable resistive load. As the resistive load 16 varies, for example, between 25.0 and 154.0 ohms, the amount of power transfer to the resistive load varies, for example, between 5.00 and 12.3 milli-watts. The electrical response signal 13 from the receiving transducer 12b is a sinusoidal output which can be rectified by conventional diode capacitor rectification circuits for converting the sinusoidal electrical response signal 13 into a substantially DC voltage and current power signal 18 that can be used to charge a battery 19 and power the internal processor 17, sensor 25 and actuator 27. An excitation frequency from the generator 34 can be tuned to the specific type of transducer 12a to maximize the power transfer from the generator 34 to the external transmitting transducer 12a to the internal receiving transducer 12b and to the load 16. A rectification circuit 16 can be optimized to receive a maximum amount of power from the internal receiving transducer 12b to the battery 19 and internal processor 17. Moreover, the power conditioner 16 could be tuned to a specific frequency such that the external processor 31 and generator 34 could be used to selectively power a plurality of embedded units 10 by respectively selective differing frequencies of the power signal 37.

Having verified that power transfer is practicable, it should now become apparent that such a sinusoidal excitation signal 37 from the generator 37 could be used to modulate digital output signals 32b from the external processor 31 to encode input data into pulse modulated data in signals 39 using the combiner 35b which can be, for example, a frequency mixer or voltage summer. In such a case, the data in driver 20 could function to square and digitize a resulting modulated pulse signal 13 into digital square wave signals sampled by the internal processor 17 for clocking input data into the processor 17. The driver 20 would function as an analog to digital converter. In another form, the data in driver 20 could be a peak threshold level detector or zero cross over comparator providing a stream of digital data in signals 21 to the internal processor 17. The frequency of the modulated pulses and the period of the pulses can be controlled by the external processor 31 to implement a predetermine data format that the internal processor 17 uses to then decode the data in digital bit stream 21 into input data. Similarly, the internal processor 17 could provide a modulated pulse signal 17a in the nature of digital square waves to the data out driver 22 which conditions the square waves into sinusoidal data out signals 23 for energizing the internal transducer 12*b*. The data out driver 22 could function as a digital to analog converter. The data out driver 22 could be a one shot device providing data out pulses 23 of predetermined duration. In another form, the data out driver 22 could be a voltage controlled oscillator providing a sinusoidal data out signal 23 from a digital signal 17*a* from the internal processor 17. In such cases, the external generator 34 may be used to demodulate sinusoidal data in signal 38 using the separator demodulator 35*a* then providing a digital bit stream input signal 32*a* to the external processor 31. There are many well known modulation and demodulation techniques available, including frequency modulation, amplitude modulation and pulse modulation where binary data bits are encoded into periodic and or modulated signals, among other types of modulation and encoding methods. Amplitude modulation has advantages in that high power continuous waves 14 provide for high continuous power transfer yet can be amplitude modulated to encode data at the tuned frequency of the transducers 12 for maximum power transfer and data bandwidth. Frequency modulation may also provide maximum power transfer because the frequency is modulated from a center tuned frequency of the transducer 12 while maintaining maximum amplitude for power transfer. Frequency modulation is also a proven way to maximize data bandwidth packing within short time durations. There may be a trade off in design between optimum power transfer and maximum data bandwidth. In the preferred form, the power signal 34 is a continuous wave continuously transferring power or alternatively a pulse wave periodically transferring power to the embedded unit 10. The continuous wave is preferably amplitude modulated or frequency modulated to encode input data with power transfer. The pulse wave can be periodically modulated or pulse width modulated to provide encoded input data with power transfer.

The present invention enables the communication of power and data from an external controller 30 to an embedded unit 10 through a coupling medium 11 using opposing transducers 12*a–b*. Those skilled in the art can make enhancements, improvements and modifications to the invention. However, those enhancements, improvements and modifications may nonetheless fall within the spirit and scope of the following claims.

What is claimed is:

1. A system for communicating power, the system comprising,
    generator means for generating an energizing signal,
    first transducer means for transducing the energizing signal into undulating pressure waves,
    medium means connected to the first transducer means, the medium means for communicating the undulating pressure waves, and
    an embedded unit means, the embedded unit means comprises:
        second transducer means connected to the medium means, the second transducer means for transducing the undulating pressure waves into electrical response signals; and
        power conditioner means for converting the electrical response signals into electrical power signals for delivering the power, the second transducer means and the power conditioner means are integrated together in the embedded unit means for electrically isolating the power conditioner means from the generator means, the medium means is also for separating and isolating the generator means from the power conditioner means;
    sensor means powered by the power conditioner means, the sensor means for sensing the condition of the environment; and
    processor means powered by the power conditioner means, the processor means for monitoring the sensor means for sensing the condition of the environment.

2. The system of claim 1 further comprising,
    a lens means disposed between the first transducer means and the second transducer means for focusing the undulating pressure waves onto the second transducer means for energy transfer of the undulating pressure waves from the first transducer means to the second transducer means.

3. The system of claim 1 wherein the embedded unit further comprises a battery means for storing power from the power conditioner means.

4. A system for communicating power, the system comprising,
    controller means for generating an energizing signal as a source of the power,
    first transducer means for transducing the energizing signal into undulating pressure waves, the energizing signal is tuned to a resonant frequency of the first transducer means,
    medium means connected to the first transducer means, the medium means for communicating the undulating pressure waves, the undulating pressure waves are tuned to the resonant frequency of the first transducer means,
    second transducer means connected to the medium means, the second transducer means for transducing the undulating pressure waves into electrical response signals, the undulating pressure waves and the electrical response signals are tuned to a resonant frequency of the second transducer means, and
    embedded unit for receiving the power from the controller means, the embedded unit comprises:
        a rectifier means for rectifying the electrical response signals into direct current power signals for receiving the power in the embedded unit;
        sensor means sensing by power received through the rectifier means, the sensing means for sensing the condition of the environment; and
        internal processor means activated by power received through the rectifier means, the internal processor means for monitoring the sensor and sensing the condition of the environment.

5. The system of claim 4 wherein the embedded unit further comprises a battery means for storing power received through the rectifier means.

6. The system of claim 4 wherein the controller means comprises,
    a generator means for generating the energizing signal, and
    external processor means for controlling the generator means to generate the energizing signal to provide power to the embedded unit at differing times.

7. A system for communicating power, the system comprising,
- a controller for generating an energizing signal as a, source of the power,
- a first transducer for transducing the energizing signal into undulating pressure waves, the energizing signal is tuned to a resonant frequency of the first transducer,
- a medium connected to the first transducer, the medium for communicating the undulating pressure waves, the undulating pressure waves are tuned to the resonant frequency of the first transducer,
- second transducer connected to the medium, the second transducer for transducing the undulating pressure waves into electrical response signals, the undulating pressure waves and the electrical response signals are tuned to a resonant frequency of the second transducer, and
- an embedded unit for receiving the power from the controller means, the embedded unit comprises,
  - a rectifier for rectifying the electrical response signals into direct current power signals for receiving the power in the embedded unit,
  - a sensor powered by the rectifier, the sensing for sensing the condition of the environment,
  - an internal processor powered by the rectifier, the internal processor for monitoring the sensor for sensing the condition of the environment, and
  - a battery for storing power received through the rectifier, the battery for delivering power to the actuator when actuated, for delivering power to the sensor when sensing, for delivering power to the internal processor when actively monitoring the sensor.

* * * * *